July 31, 1928.
J. R. CARMICHAEL
1,679,073
BILLIARD CUE
Filed Aug. 16, 1927

WITNESSES
A. B. Wallace
Jo. Baily Brown

INVENTOR
John R. Carmichael
by Brown & Critchlow
his attys

Patented July 31, 1928.

1,679,073

UNITED STATES PATENT OFFICE.

JOHN R. CARMICHAEL, OF DORMONT, PENNSYLVANIA.

BILLIARD CUE.

Application filed August 16, 1927. Serial No. 213,252.

This invention relates to cues, such as those used for playing billiards, or pool, and similar games.

An object of this invention is to provide an improved joint for such cues, which will permit ready assembly and disassembly of the sections, which will be durable, and which will not loosen or wear so as to permit play between the joined sections, and which will give a metal-to-metal joint.

Further objects of the invention are to provide a joint for cues which shall be easily and cheaply constructed, readily applied to a cue, and which will not appreciably affect the balance or center of gravity of a cue to which it is applied.

Billiard cues have been jointed heretofore, this being commonly accommplished by inserting and gluing a wooden screw member in one section, the other being bored out and threaded to receive the screw. These joints have not been especially satisfactory, partly because the wooden screw threads quickly become worn, precluding tightness of the joint. Also wooden threads are not particularly strong, and breakage frequently took place. Still another cause of lack of success arose from loosening of the screw intended to be permanently mounted in one section. The present invention provides a means of jointing these cues which overcomes the difficulties inherent in the joints previously used.

Figure 1:
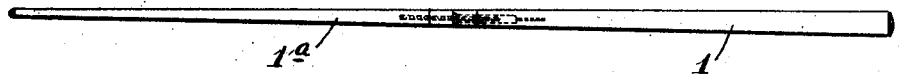
Figure 2:
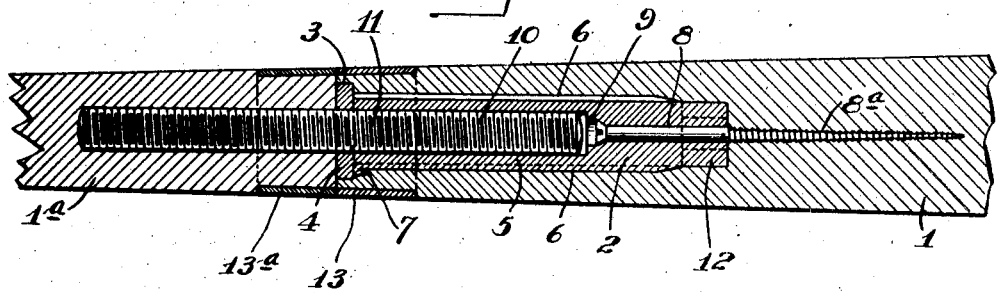
Figure 3:
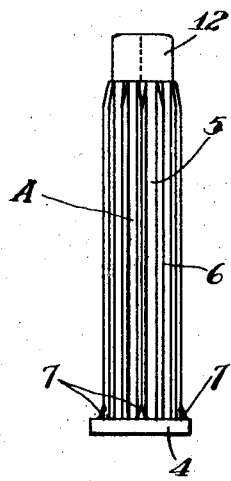

The accompanying drawings illustrate an embodiment of the invention as applied to a cue, which latter will for convenience be referred to generally as a billiard cue. In the drawings, Fig. 1 shows generally a billiard cue jointed according to the invention; Fig. 2 a longitudinal sectional view through the joint of Fig. 1; Fig. 3 an elevational view of the joint insert member; and Fig. 4 a plan view of the member shown in Fig. 3.

The invention comprises the use of a screw-receiving metal joint member, adapted to be permanently retained in one section of the cue, and to interact with a metal screw permanently mounted in the other section. The screw-receiving member is so formed as to resist any relative movement between it and the cue section, and not to be readily worn by continued use, the result being that the jointed sections are engaged tightly, but may be quickly and easily disjointed in the manner intended, without undue wear.

Referring to the drawings, the cue comprises two sections, a handle 1, and a tip $1^a$. One of these sections, preferably that indicated by the numeral 1, which is the handle section, is provided with a central axial bore 2, the outer end of which is counter-bored to provide an opening 3, of larger diameter as shown in Fig. 2.

Figure 4:
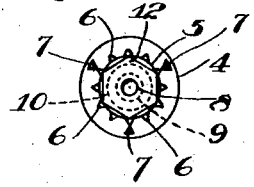

The bores 2 and 3 are adapted to receive the screw-receiving joint member A shown in Figs. 3 and 4, which comprises a circular base portion 4, and a shank 5, forming an integral structure. The shank is provided with a plurality of longitudinal angular ribs 6. Formed on the base and surrounding the shank are provided a plurality of angular teeth or lugs 7.

The member A is provided interiorly with a central opening which is preferably made as follows: An opening 8, adapted to receive the shank of a retaining screw $8^a$, is counter-sunk to form a tapered portion 9, to receive the head of the screw, and the remainder is counter-bored and threaded, as indicated at 10, to receive a jointing screw 11.

In the use of this device, screw 11 is disposed within section $1^a$, in any suitable manner, as shown in Figs. 1 and 2, and preferably glue is used to permanently seal it therein. The bore 2, 3 is made of such size as to receive and frictionally retain the joint member, the base portion fitting the bore 3 so as to be flush with the face of the section, and the diameter of bore 2 being equal to that across roots of the flutings or shanks 5, and the jointing member is driven therein, the flutings and lugs engage the wood of the cue, and when so positioned, retaining screw $8^a$ is turned into place. Glue may also be used about member A if desired.

The two sections being thus prepared, they may be readily assembled, the screw 11 engaging the threads formed in bore 10. It will be seen that in jointing or disjointing the cue it will not be possible for the jointing member A to rotate, as it will be securely held against such movement by engagement of the lugs 7 and flutings 6 with the bore in the wood in which member A makes a driven fit. In order to further increase this resistance, the upper end of shank 5 may be formed into a polygonal or non-circular portion 12. The jointing member is also preferably glued into the cue section.

In order to strengthen and prevent chipping of the section ends and splitting of the wood, the ends may be provided with ferrules 13 and 13a.

The jointing member and jointing screw may be made from any suitable material which possesses the necessary qualifications but it is preferred to make them from aluminum or aluminum alloy, which combines suitable strength with the lightness necessary to avoid unbalancing of the cue. Likewise, the ferrules may be made of the same or similar material.

The use of a metal screw securely held in one section and coacting with another metal member retained against all movement in another section adequately prevents the disadvantages inherent in prior joints, among which may be mentioned loosening of the screw or wear of the screw or the threads of the receiving section. The invention provides a tight, all-metal joint, capable of long-continued use.

I claim:

1. A jointed billiard cue comprising two sections, a jointing screw permanently disposed in one section and a screw-receiving jointing member positioned in the other section, said member comprising a circular base, a shank integral therewith, and a threaded bore formed in said base and shank to engage the threads of said jointing screw, said member having a driven fit in said section to resist relative rotary movements therebetween.

2. A jointed billiard cue comprising two sections, a jointing screw permanently disposed in one section and a screw-receiving jointing member positioned in the other section, said member comprising a circular base, a shank integral therewith, a plurality of longitudinal ribs on said shank, and a central axial bore disposed in said member, said bore being counter-bored from the base end and threaded to receive the jointing screw, said member being driven into said section and retained therein by a screw disposed in said bore, the member being positively adapted to resist rotary movements between itself and said cue section.

3. The combination with a billiard cue section having a longitudinal central bore opening from the face of the section and counter-bored adjacent said face, of a jointing member disposed therein comprising a circular base portion, a shank rising therefrom, said shank being provided exteriorly with a plurality of longitudinal flutings and said shank with a plurality of lugs surrounding said shank, said lugs and flutings engaging the cue frictionally to resist relative movements between said member and cue section, a longitudinal bore centrally formed in said member adapted to receive a retaining screw and to coact with the threads of a jointing screw permanently secured in another cue section.

4. A jointing member for billiard cues comprising a circular base portion, a shank integral therewith, a plurality of longitudinal flutings exteriorly formed on said shank and a plurality of lugs formed on said base surrounding said shank, and a central longitudinal bore formed in said member the base portion being of larger diameter and threaded to receive a cue-jointing screw.

In testimony whereof, I sign my name.

JOHN R. CARMICHAEL.